United States Patent [19]

Becker

[11] 4,189,976
[45] Feb. 26, 1980

[54] DUAL HEAD FASTENER

[75] Inventor: Stephen P. Becker, Poughkeepsie, N.Y.

[73] Assignee: Fargo Manufacturing Company, Inc., Poughkeepsie, N.Y.

[21] Appl. No.: 920,161

[22] Filed: Jun. 29, 1978

[51] Int. Cl.² ............................................. F16B 23/00
[52] U.S. Cl. .................................. 85/9 R; 81/121 R; 85/32 R; 85/45
[58] Field of Search .................. 85/9 R, 32 R, 45, 54, 85/61, 62; D8/387, 397; 81/121 R, 185, DIG. 11

[56] References Cited

U.S. PATENT DOCUMENTS

| 411,000 | 9/1889 | Anderson | 85/9 R |
|---|---|---|---|
| 838,109 | 12/1906 | Hanes et al. | 81/121 R X |
| 2,210,742 | 8/1940 | Whitney | 81/DIG. 11 X |
| 3,140,636 | 7/1964 | Grimm | 85/32 R |
| 3,413,017 | 11/1968 | Hughey | 85/9 R X |
| 3,456,549 | 7/1969 | Horton | 85/32 R |
| 3,561,317 | 2/1971 | Rowell | 85/9 R X |
| 3,618,444 | 11/1971 | Kay et al. | 85/54 X |
| 3,812,757 | 5/1974 | Reiland | 85/61 |
| 3,897,712 | 8/1975 | Black | 85/9 R |

FOREIGN PATENT DOCUMENTS

| 156457 | 7/1939 | Austria | 85/45 |
|---|---|---|---|
| 2301723 | 9/1976 | France | 85/61 |
| 2015 | of 1915 | United Kingdom | 85/32 R |
| 898026 | 6/1962 | United Kingdom | 85/61 |
| 1287779 | 9/1972 | United Kingdom | 85/61 |
| 1408532 | 10/1975 | United Kingdom | 85/54 |

Primary Examiner—Thomas J. Holko
Attorney, Agent, or Firm—Kane, Dalsimer, Kane, Sullivan and Kurucz

[57] ABSTRACT

A fastener element adapted for use as a bolt head, nut and the like. The element includes an operative structure adapted for removable interconnection with at least one other element of a fastener assembly to complete the assembly. A head extends from the operative structure and has an exterior surface adapted to be removably engaged by a wrench for rotation of the element. The head is hexagonal in configuration and has a projection extending from each side of the head a predetermined height less than the height of the head and being circumferentially aligned to thereby cooperate with the edges of each adjoining pair of sides of the head to form a twelve point head portion at the location of the projections while retaining a six point head portion at the remainder of the head. Thus, the fastener element can be used with either a six point or a twelve point wrench.

10 Claims, 8 Drawing Figures

DUAL HEAD FASTENER

BACKGROUND OF THE INVENTION

There are many criteria that require fastener characteristics that cannot be easily obtained with metallic fasteners. For example, electrical insulation, sealing out moisture, corrosion resistance, heat transfer resistance, or combinations thereof fall into this category.

It is possible to make bolts, nuts, and other hardware all of a synthetic material, or, as is done in some cases a combination, for instance, a metallic bolt with a synthetic head or nut to meet specific requirements. One limitation has been to provide a bolt head or nut that will allow sufficient torque to be applied with standard wrenches that might be encountered in day to day operation.

Wrenches for a given size hex bolt or nut are usually available in either six or twelve points. The difference between these two configurations can cause some problems when they are used on standard metallic heads. However, the difference becomes quite significant when synthetic materials form the hexagonal head or nut.

Naturally the nut and bolt art is quite highly developed as well as the wrench art where six and twelve sided nuts are handled with various types of socket wrenches.

Examples of patents which are directed to materials and head structure include Swiss Pat. No. 294,797 and U.S. Pat. Nos. 3,731,961; D-157,484; D-187,818; D-203,947; D-220,027; and D-233,735.

Examples of types of wrenches which have been designed to handle six and twelve sided nuts are recognizable in U.S. Pat. Nos. 1,106,752; 2,106,749; 2,337,368; 2,502,587; 2,651,230; 2,991,678; 3,433,108; 3,835,737; and French Pat. No. 1,263,619.

It has been found that use of a six point wrench on a hexagonal head of synthetic material will allow sufficient torque to be applied on heads that are molded onto a metallic shank or bolt. It is also possible to utilize the elastic limit of the material as a safety factor to prevent too much force being applied and causing the head to rotate in relation to the shank. When the elastic limit is reached, the corners of the hexagonal head will bend, allowing the wrench to slip. It the material has been properly chosen, it will return to its original shape when the pressure is removed insuring that it is suitable for removal with the same wrench and re-use.

If a twelve point wrench is used on this same hexagonal head, the presence on the corners of the synthetic material is on a smaller area which generally results in either or both of the following. First, the corners will cam before sufficient torque can be applied to accomplish the desired function. Second, the increased pressure per unit area causes the synthetic material to flow so that the head is not re-usable.

One possible solution to this situation is to fabricate a twelve point head, or bolt, for use with a twelve point wrench. Of course it is not possible to utilize a six point wrench on this twelve point head.

Accordingly, there is clearly a need for a more versatile head particularly when dealing with synthetic type fastener elements which can be easily and effectively handled with different types of tools at hand such as six and twelve point wrenches.

SUMMARY OF THE INVENTION

With the above background in mind, it is among the primary objectives of the present invention to provide a fastener element in the form of a head of synthetic or metal material which has a combination outer surface. A portion of the head has a six point configuration and another portion of the head has a twelve point configuration. The most effective arrangement is to have a twelve point configuration on the bottom and a six point configuration on the top. This allows use of either a six point or a twelve point wrench while making it compatible with the head to meet the torque and "camming" requirements.

The type of head of the present invention is designed for integral formation with a bolt, adapter arrangement or to be formed as one of a variety of types of nuts. It can be formed as a molded synthetic material head for a metal threaded bolt where it is molded directly onto the bolt. It can be used as an insulated adapted in the form of a non-metallic synthetic plastic material with a housing to receive a metal element therein. In nut construction the head can be formed as a conventional nut with an hexagonal surface configuration and the lower portion formed with a series of six projections spaced with one projection on each side of the hexagonal nut. This forms a twelve point surface provided by the edges of the projection and the edges of adjoining sides on the lower half of the nut and a six point surface formed by the adjoining edges of each pair of sides of the hexagonal nut on the upper half of the nut. A threaded aperture can be passed through the head and appropriate flanges can be employed for various types of conventionally shaped flanged nuts.

In summary, a fastener element is provided which is adapted for use as a bolt head, nut and the like. It includes an operative structure adapted for removable interconnection with at least one other element of a fastener assembly to complete the assembly. A head extends from the operative structure and has an exterior surface adapted to be removably engaged by a wrench for rotation of the element. The head is hexagonal in configuration on its outer surface for a predetermined portion of its height and has a twelve sided configuration on its outer surface for a further predetermined portion of its height. In this manner, the fastener element is usable with either a six point or a twelve point wrench.

With the above objectives among others in mind, reference is made to the attached drawing.

DETAILED DESCRIPTION

Figure 1:
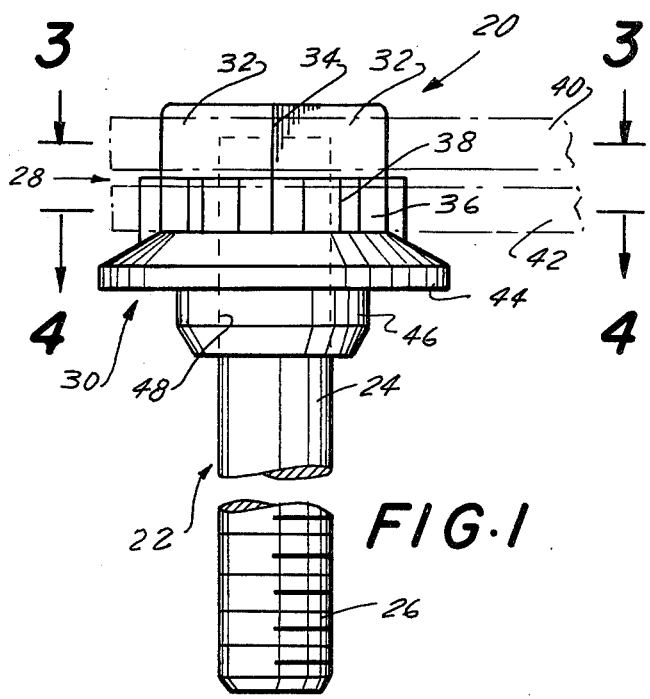
FIG. 1 is a side elevation view of a bolt formed with a head according to the invention and portions of two wrenches shown in phantom, one for engagement with the twelve point portion of the head and the other for engagement with the six point portion of the head.
Figure 2:
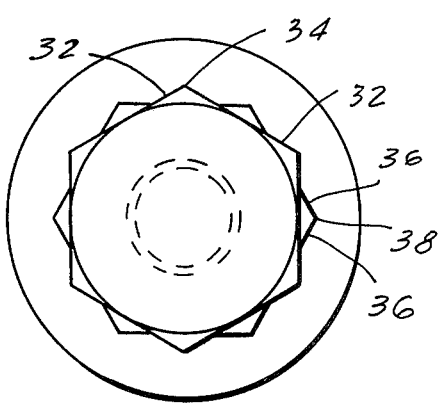
FIG. 2 is a top plan view thereof.
Figure 3:
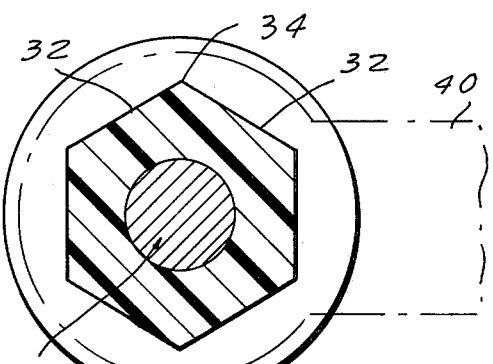
FIG. 3 is a sectional top view thereof taken along the plane of line 3—3 of FIG. 1.

The embodiment of FIGS. 1-4 shows a fastener element of the invention with the element formed as a head 20 attached to a bolt 22. In a conventional manner, head 20, formed of a synthetic plastic material can be mounted directly to the shank 24 of the bolt 22. The portion of shank 24 extending from the head 20 has a threaded end portion 26 for coupling with an appropriate nut.

Head 20 includes an upper portion 28 and a lower portion 30. The upper portion 28 forms the engagement surfaces for appropriate tools such as six and twelve point wrenches. The upper portion 28 is a six sided hexagonal element with each pair of adjacent sides 32 meeting at a point or edge 34. Thus, there are six sides 32 and accordingly six edges 34. Sides 32 are flat and the lower half of each side 32 contains a central projection 36 which is triangular in cross section and terminates in an apex away from the surface of side 32. The apex or edge 38 of each projection 36 cooperates with the adjacent edges 34 of each pair of sides 32 to form parallel point or edges about the circumference of the head. Thus, the edges 34 and the edges 38 provide twelve points on the lower half of upper portion 28. The projections 36 can be molded directly to the head or attached in a convenient fashion such as by epoxy. They are located approximately in the center of each side and are upright so that the apex or extending edge or point 38 of each projection 36 is parallel to the edge or point 34 of each pair of adjacent sides 32.

Accordingly, the upper half of upper portion 28 forms a six point surface and the lower half of upper portion 28 forms a twelve point surface. As shown in phantom in FIG. 1, a six point wrench 40 will naturally engage with the six sided upper half of upper portion 28 to supply the necessary torque to rotate the bolt. When a twelve point wrench 42 is used as shown also in phantom in FIG. 1 it will slip onto the lower half of upper portion 28 to engage with the twelve points and apply the required torque for rotation of the bolt. Thus the head is versatile in that two different types of wrenches can be employed to successfully operate the bolt without the necessity of alteration in structure or unnecessary torque or deformation applied to the structure.

While the embodiment depicted includes a plastic head and a metal bolt, naturally the design of the present invention can be employed with an all metal or all plastic bolt and head assembly.

The lower portion of head 20 is also of plastic material and includes a conically shaped flange 44 extending downwardly therefrom and a tubular collar 46 extending downwardly from the flange. A central bore 48 extends upward through the collar 46, the flange 48 and into the upper portion 28 of the head to receive the upper end of shank 24. As stated, it is conventional to mold head 20 directly to the shank 24 of bolt 22, however, the interconnection can be accomplished equally as well by other means such as by appropriate bonding and fastening principles.

It should be noted that, with the type of bolt depicted in FIGS. 1-4, tightening of the bolt will be accomplished with up to about 600 inch pounds of force before the plastic material will fail thereby preventing reuse. This is with a conventional size and type of bolt under consideration in the environments discussed above. With the dual head, it should also be kept in mind that should the failure point be reached while working with either a six or twelve point wrench, the other type of wrench could then be used with the cooperating mating portion of the head and still enable the required turning action for the bolt.

Figure 4:
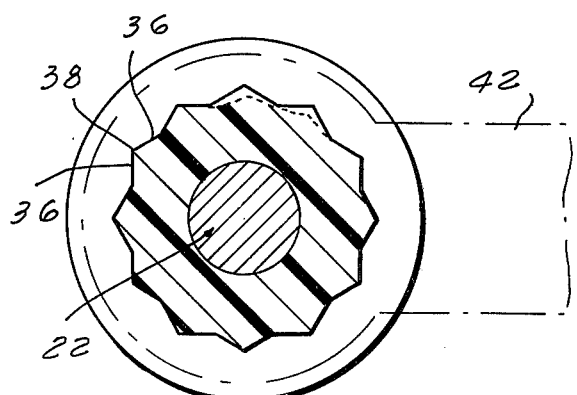
FIG. 4 is a sectional top view thereof taken along the plane of line 4—4 of FIG. 1.

By providing the six point and twelve point head features on the structure of the present invention it is possible to permit sufficient torque to be applied with two different types of standard wrenches encountered in day to day operation. The six point wrench on an hexagonal head of synthetic material such as plastic allows sufficient torque to be applied to heads that are molded onto a metallic shank or bolt. It is also possible to utilize the elastic limit of material as a safety factor to prevent too much force being applied and causing the head to rotate in relation to the shank. When the elastic limit is reached, the corners of the hexagonal head will bend, as shown in FIG. 4, allowing the wrench to slip. If the material is properly chosen, it will return to its original shape when the pressure is removed insuring that it is suitable for engagement with the same wrench and reuse.

However, if a twelve point wrench is used on the same hexagonal head, the pressure on the corners of the synthetic material is on a smaller area which results in one or two deleterious effects as discussed above. Either, the corners will cam before sufficient torque can be applied to accomplish the desired function or the increased pressure per unit area causes the synthetic material to flow so that the head is not reusable.

As stated, if a twelve point head or bolt is used with a twelve point wrench, it would not be possible to use a six point wrench on a twelve point head. Accordingly, the concept of the present invention is to form a head of synthetic material, or metal if desired, with a twelve point configuration on the bottom or top and a six point configuration on the bottom or top. This allows use of either wrench while making it compatible with the head to meet the torque and camming requirements.

Figure 5:
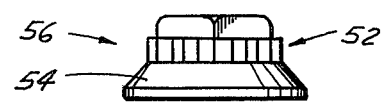
FIG. 5 is an alternative embodiment of the fastener element of the invention incorporated as part of a flanged nut.
Figure 6:
FIG. 6 is a second alternative embodiment of the fastener element of the invention incorporated as a nut.

FIGS. 5 and 6 show the upper portion of head 28 formed as part or all of a nut. Nut 50 of FIG. 6 is identical to upper portion 28 of head 20 of the embodiment of FIGS. 1-4 with the exception that it has a threaded through passageway for permitting it to act as a nut to be coupled with a bolt.

Nut 52 of FIG. 5 is identical to the nut of FIG. 6 with the addition of a fustroconically shaped flange 54 extending downwardly and outwardly therefrom. In all other respects the upper portion 56 of nut 52 is identical to upper portion 28 of head 20 of the bolt of FIG. 1.

Figure 7:
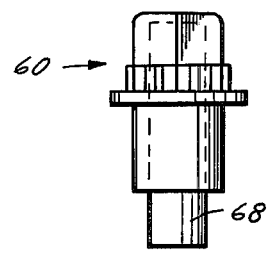
FIG. 7 is a third alternative embodiment of the invention with the fastener element forming the head of an insulated adapter with a metal element mounted therein.
Figure 8:
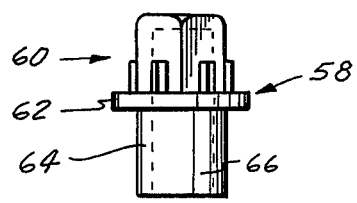
FIG. 8 is a side elevation view of the embodiment of FIG. 7 without the metal element mounted therein.

FIGS. 7 and 8 show an insulated adapter 58 which is of a conventional nature with the exception of upper portion 60 which is similar to upper portion 28 of head 20 of FIGS. 1-4. It contains the six point and twelve point combination structure of upper portion 28. The lower portion of adapter 58 contains an annular flange 62 starting at the bottom surface of the projections on upper portion 60 and a tubular collar 64 terminating in an open end. A bore 66 extends upward through adapter 58 to adjacent the upper closed end of the adapter.

As shown in FIG. 7, the adapter is designed to have bore 66 with an hexagonal configuration and to receive a metal element 68 therein. As shown in FIG. 7, the hexagonal shaped element extends within bore 66 and extends downwardly and outwardly therefrom. Aluminum is a common metal used for element 68.

All of the embodiments in FIGS. 5–8 are designed to be formed of a common non-metallic plastic material such as polyurethane. They can be molded in a similar manner as the head of bolt 20 of FIGS. 1–4 is molded.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

I claim:

1. A fastener element adapted for use as a bolt head, nut and the like comprising; an operative structure adapted for removably interconnecting with at least one other element of a fastener assembly to complete the assembly, a head extending from the operative structure and having an exterior surface adapted to be removably engaged by a tool for rotation of the element, the head being hexagonal in configuration on its outer surface for a predetermined portion of its height and being of a twelve pointed configuration on its outer surface for a predetermined portion of its height thereby permitting the use of a fastener element with a tool adapted for engagement with a six pointed surface or a tool for engagement with a twelve pointed surface, the head being hexagonal in configuration and having a projection extending from each side thereof a predetermined height less than the height of the head and being circumferentially aligned to thereby cooperate with the edges of each adjoining pair of sides to the head to form a twelve point head portion at the location of the projection while retaining a six point head portion at the remainder of the head formed by the point of joinder of the six sides thereby permitting the use of the fastener element with either a six point or a twelve point wrench.

2. The invention in accordance with claim 1 wherein the projections are formed adjacent the base of the head and are triangular in cross section extending outwardly to an apex forming an edge parallel to the adjacent two side edges of the hexagonally shaped head.

3. The invention in accordance with claim 1 wherein the projections are formed adjacent the base of the head and flange extends from the bottom of the head from which extends operative structure for coupling with another fastener element.

4. The invention in accordance with claim 1 wherein the head is formed of a synthetic non-metallic material.

5. The invention in accordance with claim 1 wherein the head forms the upper portion of a bolt with a shank extending from the underside thereof having a threaded end portion for interengaging with a nut.

6. The invention in accordance with claim 5 wherein the bolt is formed of a steel material and the head is formed of a synthetic non-metallic material, a flange at the base of the head and having a collar extending downwardly therefrom, the bore in the collar adapted to receive and couple the head of the shank of the bolt.

7. The invention in accordance with claim 1 wherein the head is the upper portion of an adapter with the projections positioned adjacent the base of the head, an annular flange extending outwardly from the bottom end of the head and a tubular socket extending from the flange, the socket being open at the free end and having a hexagonal configuration on its inner surface.

8. The invention in accordance with claim 7 wherein the hexagonal configuration in the tubular extension extends into the interior of the upper portion of the adapter and the hexagonal configuration is adapted to receive a metal element therein, the adapter being formed of a non-metallic synthetic material.

9. The invention in accordance with claim 1 wherein the head has an aperture therethrough with the projections located adjacent one end of the head so that the head forms a threaded nut for coupling with a threaded fastener element to form a fastener assembly.

10. The invention in accordance with claim 9 wherein the threaded nut has a conical flange extending downwardly and outwardly from the bottom end thereof adjacent to the projections to form a flanged nut for coupling with a threaded fastener element of a fastener assembly.

* * * * *